United States Patent [19]

Keegan

US005602670A

[11] Patent Number: 5,602,670
[45] Date of Patent: Feb. 11, 1997

[54] OPTICAL DATA RECEIVER EMPLOYING A SOLAR CELL RESONANT CIRCUIT AND METHOD FOR REMOTE OPTICAL DATA COMMUNICATION

[75] Inventor: Patrick J. Keegan, North Hollywood, Calif.

[73] Assignee: Rheem Manufacturing Company, New York, N.Y.

[21] Appl. No.: 540,745

[22] Filed: Oct. 11, 1995

Related U.S. Application Data

[63] Continuation of Ser. No. 329,300, Oct. 26, 1994, abandoned.

[51] Int. Cl.⁶ .................................................. H04B 10/06
[52] U.S. Cl. ........................... 359/193; 359/144; 359/189
[58] Field of Search .................................. 359/142, 194, 359/144, 189, 193, 195

[56] References Cited

U.S. PATENT DOCUMENTS

| | | | |
|---|---|---|---|
| 3,240,943 | 3/1966 | White | 250/206 |
| 3,480,781 | 11/1969 | Mandalakas | 250/209 |
| 3,488,506 | 1/1970 | White | 250/212 |
| 3,700,336 | 10/1972 | Clegg | 356/226 |
| 3,927,316 | 12/1975 | Citta | 250/199 |
| 4,152,597 | 5/1979 | Sher | 250/370 |
| 4,313,228 | 1/1982 | Berstein | 359/144 |
| 4,912,522 | 3/1990 | Oates | 359/168 |
| 5,033,112 | 7/1991 | Bowling | 359/142 |
| 5,239,402 | 8/1993 | Little | 359/194 |
| 5,276,336 | 1/1994 | Winterhalter | 359/144 |

FOREIGN PATENT DOCUMENTS

| | | | |
|---|---|---|---|
| 0372742 | 6/1990 | European Pat. Off. | 359/189 |
| 0136839 | 12/1979 | Japan | 359/189 |
| 0096435 | 6/1983 | Japan | 359/189 |
| 0099634 | 4/1988 | Japan | 359/189 |
| 0136836 | 6/1988 | Japan | 359/189 |
| 0068037 | 3/1989 | Japan | 359/189 |
| 0158802 | 6/1990 | Japan | 359/189 |
| 4329037 | 11/1992 | Japan | 359/189 |

*Primary Examiner*—Leslie Pascal
*Attorney, Agent, or Firm*—Konneker & Smith

[57] ABSTRACT

A receiver circuit and method for receiving a signal having a given carrier frequency. The circuit comprises: (1) a solar cell receiver having a selected capacitance and (2) an inductive device having a selected inductance and coupled to the solar cell receiver, the solar cell receiver and the inductive device cooperating to form a resonant circuit having a selected resonant frequency associated therewith and being a function of the selected capacitance and the selected inductance, the resonant circuit resonating in response to a change in the signal to thereby allow the solar cell to receive data carried by the signal. By employing solar cell as part of a resonant circuit, the range of optical remote controls can be extended to as much as a mile. In one embodiment, the receiver circuit forms a portion of a remote-controlled pool or spa.

28 Claims, 2 Drawing Sheets

OPTICAL DATA RECEIVER EMPLOYING A SOLAR CELL RESONANT CIRCUIT AND METHOD FOR REMOTE OPTICAL DATA COMMUNICATION

This is a continuation, of application Ser. No. 08/329,300, now abandoned filed Oct. 26, 1994.

TECHNICAL FIELD OF THE INVENTION

The present invention is directed, in general, to a remote communications apparatus and, more specifically, to an optical receiver employing a solar cell as a component in a resonant circuit therein to allow reception of data from a remote optical transmitter.

BACKGROUND OF THE INVENTION

Transmission of data via optical links, in general, is not few. For years, devices have employed optical, and particularly infrared, transmitters and receivers for allowing line-of-sight remote control of the devices. These optical remote controls have proven popular with consumers because they free the consumers from having to spend energy travelling to a device to control the device.

Most typically, an optical remote control transmitter comprises a power source, such as a battery, that is coupled to a keypad, a carrier wave generation circuit and a coding circuit. Depending upon which of the keys of the keypad are depressed, the coding circuit produces a code that modulates the carrier wave produced by the carrier wave generator. The modulated carrier wave energizes one or more infra-red light emitting diodes ("LEDs") to produce an optical signal that emanates from the transmitter. In almost all remote control transmitters the optical signal spreads in a conical pattern from the transmitter, and thus signal strength per unit area decreases as the square of the distance from the transmitter to the receiver. The amount of energy contained in this beam is limited by the capabilities of the battery and the efficiency of the LEDs. The signal strength within the beam at the receiver is directly proportional to the sensitive area of the detector element which intercepts the beam and inversely proportional to the distance between the transmitter and the receiver.

On the remote control receiver side, it is typical to provide a PIN-type photodiode as the receiving element. Such photodiodes lave a good response to infrared radiation because of their thicker depletion region, a very good high frequency response and low intrinsic capacitance, so that the optical signal is transformed into an electrical signal without serious degradation. However, because photodiodes have a very small detector area, usually less than 0.1 inches square, they intercept very little of the energy radiated by the transmitter. As a result, the output signal they produce is extremely small and necessitates the use of special high gain, low noise preamplifiers before a signal of usable amplitude is obtained. Photodiode receiver circuits are also sensitive to extraneous light sources that produce electrical noise in the detector output. Strong light sources saturate the detector circuit so that no usable signal can be detected.

As can be seen, the remote control transmitter must be fairly close to a photodiode-based remote control receiver before the photodiode can generate an electrical signal of usable strength. In general, the transmitter must be within 30 feet of the receiver for the photodiode to generate a satisfactory signal. Furthermore, special baffles and optical filters are mandatory if the system is to operate in areas with high ambient light levels or direct sunlight. Thus, the range and applicability of prior art photodiode-based, battery-powered optical data transmission systems and remote controls have been limited.

It is highly desirable to provide an optical communications system or remote control that has a range greater than 30 feet and that is not seriously affected by the presence of high ambient light levels. There are many applications that would benefit from such a system, if it were not for the above-described limitations inherent in the prior art. For instance, outdoor systems such as spas or swimming pools would realize distinct advantages from optical remote control systems having a range of 100 feet or more. It is more convenient for a user to adjust water temperature, pumping velocity, pool lighting or the other auxiliary functions without having to exit the spa or pool. Present systems employing direct electrical connection or pneumatic controls demand that the transmitter be mounted at a fixed point relative to the pool or spa. These systems are expensive to install because the lines connecting the control to the equipment must be protected. Pneumatic systems provide only a limited number of control options and electrical systems require elaborate safeguards to minimize the risk of electrical shock arising from the user's direct contact with house-current-powered equipment. Systems employing radio-frequency ("RF") links are expensive and must meet rigorous standards as to construction and operation to prevent interference with other RF and electrical systems. The same arguments can be made for garage door openers, security systems, surveying equipment and even line-of-sight voice communications systems.

One solution to the range and ambient light problem would be to use a solar cell as the signal detector in the receiver. Solar cells, by virtue of their large detector area, are much more sensitive to optical signals of low power. Furthermore, when operating in a "current" or "short circuit" mode, they do not saturate in the presence of strong ambient light. Properly applied, the use of a solar cell as the signal detector could simplify a remote control system, significantly increase its operating range and greatly reduce its sensitivity to ambient light.

Despite the advantages solar cells have over photodiodes, they have not been employed as signal detectors because they are capacitive by nature, exhibiting a capacitance of approximately 0.1 µF per square inch of detector area. The resulting capacitive reactance acts as a low impedance load across the solar cell output. At any useful carrier frequency, this reactive load absorbs a very significant percentage of the received signal energy.

Therefore, what is needed in the art are a circuit and method for allowing remote control from a greater range. Preferably, the circuit and method should take advantage of the sensitivity of a solar cell to weak optical signals but should overcome the concomitant signal-depletion problems associated with such cells.

SUMMARY OF THE INVENTION

To address the above-discussed deficiencies of the prior art, it is a primary object of the present invention to provide a means of greatly extending the range of battery-powered, hand-held optical data communications systems and to minimize their sensitivity to ambient lighting.

In the attainment of the above primary object, the present invention provides a receiver circuit and method for receiving a signal having a given carrier frequency. The circuit comprises: (1) a solar cell receiver having a selected capacitance and (2) an inductive device having a selected inductance and coupled to the solar cell receiver, the solar cell receiver and the inductive device cooperating to form a resonant circuit having a selected resonant frequency associated therewith and being a function of the selected capacitance and the selected inductance, the resonant circuit resonating in response to a change in the signal to thereby allow the solar cell to receive data carried by the signal.

Thus, the present invention is the first to employ the solar cell as a component in a resonant (or "tank") circuit. The present invention therefore combines the solar cell's innate capacitance with a selectable inductance to yield a resonant circuit having a resonant frequency that is preferably tuned to changes in the signal (preferably changes in a desired subcarrier frequency). The solar cell has a photosensitive area that is large when compared to the photosensitive area of the PIN-type photodiode of the prior art.

When the solar cell of the present invention receives light pulsating at or narrowly about the subcarrier frequency, the solar cell and the inductive device resonate in sympathy therewith, resulting in a quick response of the solar cell to changes in the subcarrier frequency and allowing data to be transmitted via the solar cell with high fidelity and reliability, even while the solar cell is exposed to direct sunlight. Conversely, light that is not pulsating within a band about the subcarrier frequency does not trigger a sympathetic resonance in the resonant circuit and is therefore ignored. By employing a solar cell as a component in a resonant circuit, remote control range can be extended past 30 feet to several hundred feet, without requiring any modification whatsoever to the transmitter.

In a preferred embodiment of the present invention, the given carrier frequency is substantially infrared. Infrared light is easily generated by conventional LED transmitters and is of sufficiently high frequency to provide a suitable bandwidth for data. In an embodiment to be illustrated, the carrier frequency is set at 9400 Å.

In a preferred embodiment of the present invention, the infrared carrier frequency is pulse modulated at a selected subcarrier frequency. The subcarrier frequency is frequency modulated about a center frequency of 16.133 KHz and within a range of ±260 Hz to carry the data. The resonant circuit is designed to resonate in response to the frequency-modulated pulsations.

In a preferred embodiment of the present invention, the inductance is tunable. In a more preferred embodiment, the inductive device is a slug tuned, step-up autotransformer whose primary inductance is selected to match the solar cell capacitance at the subcarrier frequency (16.133 Khz, in the embodiment to be illustrated). Slug tuning allows selection of the subcarrier frequency and adjustment of individual receiver circuits during manufacture to ensure proper frequency response. The DC resistance of the primary winding of the inductive device should be as low as possible. Further, the magnetic structure of the inductive device should be such that the inductive device does not magnetically saturate when carrying large DC bias currents, e.g., in the order of 0.5 Å. For best operation, the DC resistance of the primary winding should not exceed 1.0 Ω. The secondary inductance is selected to match the input impedance of an amplifier circuit that follows.

In a preferred embodiment of the present invention, the resonant circuit is coupled to an amplifier circuit to amplify the signal as received by the resonant circuit. Unlike prior art photodiode-based receivers, the amplifier circuit of the present invention does not need to be a special high-gain, low-noise amplifier. This simplifies circuitry and raises circuit reliability.

The terms "high gain, low noise amplifier," as used to refer to amplifiers found in photodiode-based receivers, means in particular special low noise amplifiers having gains of several hundred that are carefully designed and constructed of special low noise components. The present invention permits the use of an amplifier having a gain of about 60 that can be constructed of standard commercial components in a conventional manner.

Amplifiers for use with photodiodes must be carefully designed because the photodiode output, both signal and noise, is very small and the amount of amplification needed is large. Amplifiers tend to amplify the noise they generate, as well as the input signal, therefore the amplifier noise must be very small or it can mask the photodiode signal. The solar cell output, both signal and noise, is comparatively large so "high gain" is not needed.

In a preferred embodiment of the present invention, the solar cell receiver and the inductive device are connected in electrical parallel to form a parallel LC tank circuit. A shunt capacitor may also be coupled across the inductive device to alter the selected resonant frequency of the parallel resonant circuit to allow the parallel resonant circuit to receive carrier frequencies generated by conventional infrared remote control transmitters having a lower subcarrier frequency.

However, placement of the shunt capacitor across the inductive device and in parallel with the solar cell reduces the circuit "quality" or "Q" and therefore the communication range. Such a capacitor may be used to construct the receiver circuit of "off the shelf" components, even though they may not quite match. Use of the shunt capacitor may limit the range to between 135 feet and 165 feet in full daylight, about 30% less than can be achieved without the capacitor. Use of the capacitor does not allow the receiver circuit to receive "off-the-shelf" infrared remote control transmitter signals. Conventional infrared transmitters (such as television remote controls) usually operate at subcarrier frequencies of from 30 Khz to 60 Khz.

In a preferred embodiment of the present invention, the receiver circuit is part of a remote controllable device, a control mechanism coupled to the receiver circuit and adapted to receive and respond to a command signal from the receiver circuit. In a more preferred embodiment, the receiver circuit is part of a remote controllable fluid control apparatus. Thus, the present invention is suited for use in a spa or pool control system.

Such spa or pool control systems take commands from a user and make adjustments to equipment associated with the spa or pool in response thereto. Such adjustments are made by way of one or more fluid control mechanisms, including temperature regulators (such as thermostatically-controlled heaters), pumps and valves under control of fluid control circuitry. The fluid control mechanisms qualitatively or quantitatively control delivery of fluid to a fluid reservoir (the spa or pool itself).

In a preferred embodiment of the present invention, one or more sensors are coupled to the fluid control circuitry and thereby affect control of the fluid control mechanism. The sensors are adapted to sense physical conditions for use by the system and may be selected from the group consisting of: a temperature sensor, a pressure sensor and a fluid flow rate sensor. The system as a whole therefore preferably makes system adjustments based on sensed conditions and user commands.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
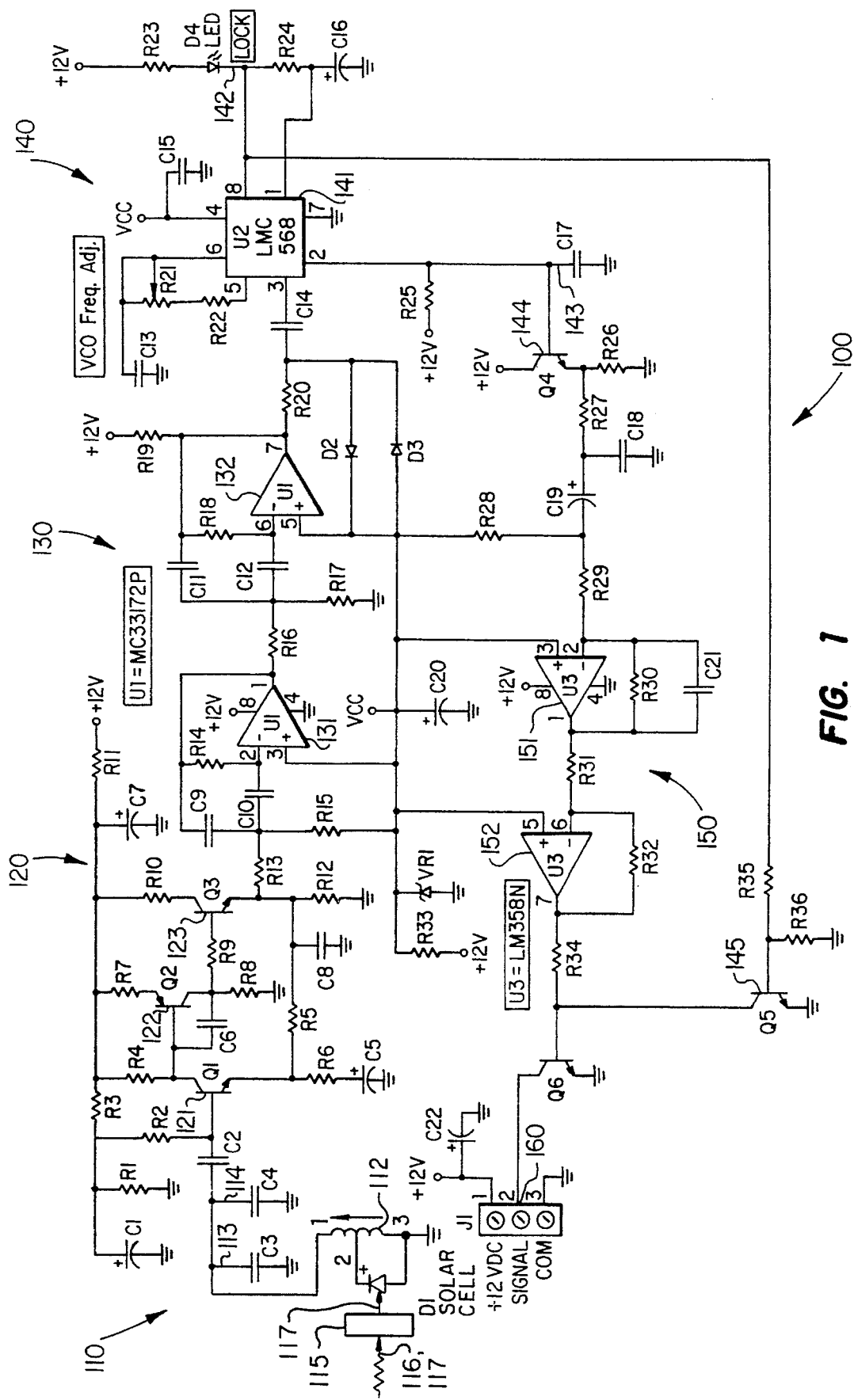
FIG. 1 illustrates a schematic diagram of the receiver circuit including the resonant circuit of the present invention employing a solar cell as an optical receiver.

Referring initially to FIG. 1, illustrated is a schematic diagram of a receiver circuit, generally designated 100, including a resonant circuit, generally designated 110, having a resonant frequency. As previously described, the resonant circuit 110 employs a solar cell to receive data from a remote control transmitter (not shown in FIG. 1) carried by a pulse-modulated carrier wave of optical frequency.

In the illustrated embodiment, the optical signal carrier wave is pulse modulated about a subcarrier center frequency of 16.133 KHz. The 16.133 KHz subcarrier is frequency modulated ±260 Hz to allow binary data to be carried. In the illustrated embodiment, the subcarrier frequency is increased 260 Hz when a logical "one" is to be transmitted and the subcarrier frequency is decreased 260 Hz when a logical "zero" is to be transmitted. In practice, logical "ones" and "zeros" are concatenated into words according to conventional protocol, allowing commands to be transmitted from the remote control transmitter to the receiver circuit 100.

The present invention is designed to operate in conjunction with a remote control transmitter of conventional design employing one or more infrared LEDs as transmission elements. However, those skilled in the art will understand that the present invention can be made to operate in conjunction with other-than-infrared remote control transmitters, although the response of a standard solar cell falls off rapidly as the carrier frequency is increased from infrared. In fact, solar cells have almost no ultraviolet response at all.

The resonant circuit 110 includes a solar cell 111 having an innate selected capacitance and an inductive device 112 (a tunable autotransformer in the illustrated embodiment) having a selected inductance and coupled to the solar cell 111 in electrical parallel.

The inductive device 112 is connected across the solar cell 111 so that the solar cell 111 capacitance, in conjunction with the inductance of the inductive device 112, forms the resonant (or "tank") circuit 110 having a resonant frequency associated therewith and being a function of the selected capacitance and selected inductance.

At resonance, the inductive reactance of the inductive device 112 and the capacitive reactance of the solar cell 111 neutralize each other and the impedance which appears across the solar cell 111 output becomes a function of the Q of the reactive components. If the solar cell 111 is viewed strictly as a capacitor, its Q at low signal levels is quite high, since the dielectric losses in the PN junction of the solar cell 111 are low as are the resistive losses. If the inductive device 112 exhibits equally low losses, a circuit Q of 10 or greater is achievable and the impedance ("Z") of the tank circuit across the solar cell 111 output may, for engineering purposes, be defined as:

$$Z=QX_c$$

where $X_c$ is the capacitive reactance of the solar cell 111 at resonance.

Optical energy striking the solar cell 111 that is within the color band to which the solar cell 111 is sensitive and that is pulse modulated by a frequency within the pass band of the resonant circuit 110 produces a pulsating voltage across the solar cell 111 output and causes the resonant circuit 110 to resonate at the modulating frequency. The pass band of the resonant circuit 110 may be defined as any frequency which falls within the range:

$$F=F_o\pm F_o/2Q$$

where $F_o$ is the resonant frequency of the resonant circuit 100.

Modulating frequencies outside this pass band are attenuated and, thus, the sensitivity of the resonant circuit 110 to extraneous light signals is reduced. Furthermore, the low DC resistance of the inductive device 112 forces the solar cell 111 to operate in a "short circuit" or "current" mode. In this mode the solar cell 111 output current is directly proportional to the intensity of the incident radiation to which the solar cell 111 is sensitive. Thus the solar cell 111 does not saturate, even in the presence of strong light sources such as the sun, that may produce large DC bias currents in the solar cell 111 without diminishing the amplitude of the data carrier signal. Since the solar cell 111 is a semiconductor device, these large bias currents, that can be several thousand times as large as the root mean square ("RMS") signal current, cause the generation of electrical noise.

Components of this noise fall within the pass band of the resonant circuit 110 and interfere with the reception of weak data signals. This is prevented by placing an optical filter 115 in front of the cell 111. A suitable filter can be constructed from a thin sheet of commercially-available acrylic plastic containing any one of a number of color additives, such as Rohm Haas Cellcast Acrylic, color number 2030 Green or 2114 Blue. These filter materials attenuate that portion of the visible spectrum and the near infrared to which the solar cell 111 is sensitive and pass the longer wavelengths (9400 Å to 9800 Å) generated by the selected infrared LEDs. The filter materials described above reduce the bias currents and noise produced by direct sunlight 116 by over 80 percent. Thus, the filter 115 receives both ambient light, such as sunlight 116, and the incident optical light signal 117 generated by the remote control transmitter (see FIG. 2), but substantially only passes the longer wavelength optical signal 117.

The inductive device 112 preferably has a DC resistance on the order of 1.0 Ω. This DC resistance is important for two reasons. First, the lower the resistance, the higher the response of the resonant circuit 110 as a whole to changes in subcarrier frequency. Thus, the response of the resonant circuit 110 is improved. Second, because the solar cell 111 operates in a "current" or "short circuit" mode (wherein the solar cell 111 generates maximum current and minimum voltage when exposed to light), the solar cell 111 can continue to detect the optical signal even when exposed to direct sunlight 116.

The size of the solar cell 111 is limited only by the carrier frequency and practical inductive device 112 size limitations. However, for purposes of the illustrated embodiment, the solar cell 111 is approximately 1"×2" (2 cm×6 cm), yielding an active detector area of just under 2.0 in.$^2$.

The solar cell 111, as used herein, is a "current" device. Its output voltage is inversely proportional to solar cell 111 temperature and falls from a nominal 0.64 volts at −20° C. to 0.1 volt at +180° C. Its output current into a load of no resistance is relatively constant with temperature over this range and is directly proportional to the incident light energy 117. Thus, a fixed signal energy from the transmitter produces a pulsating current in the solar cell 111 of a certain amplitude.

As the amplitude of extraneous light sources increases, the extraneous bias currents also increase, but the signal current, superposed over these signals, remains the same amplitude. This relationship remains true and constant for any reasonable environmental solar cell 111 temperature. As the load resistance increases, the straight-line relationship between incident light 117 and output current degrades into a curve and the amplitude of the signal current pulses decreases with an increase in extraneous light, becoming zero where the output voltage limit is reached.

The 1.0 Ω limit on the resistance of the primary winding of the inductive device set above assumes that an optical filter of the type previously described is used. This optical filter reduces the bias currents produced by a good quality 2.0 square inch cell exposed to direct sunlight 116 from over 0.5 amp to about 0.06 amp, which is "reasonable." If no filter 115 is included, maximum coil resistance should not exceed 0.12 Ω for outdoor use, presenting an engineering challenge to implement.

Capacitors 113, 114 are coupled between an output of the inductive device 112 and ground. The capacitors 113, 114 are optional and are used to tune the innate capacitance of the solar cell 111 and thereby decrease the resonant frequency of the resonant circuit 110 as a whole to allow the resonant circuit 110 to resonate to a lower subcarrier frequency. This permits the resonant circuit 110 to be used in conjunction with an infrared remote control transmitter of conventional design as described above, operating at a subcarrier frequency of 16.133 KHz.

When the solar cell 111 receives optical energy proximate the selected resonant frequency of the resonant circuit 110, the solar cell 111, inductive device 112 and optional capacitors 113, 114 cooperate to resonate in response thereto, rendering the solar cell 111 extremely sensitive to the presence of, and to small changes in the frequency of, the optical energy. As previously described, this greatly increased sensitivity and response allows the solar cell 111 to effect optical communication over great distances. Whereas prior art infrared receivers had a maximum range measured in the tens of feet, the present invention allows a range of hundreds of feet for consumer applications. With upgraded optics and increased transmitting power, the present invention is capable of attaining ranges of a mile or more, greatly enhancing the number of useful applications for line-of-sight communication.

The output of the resonant circuit 110 is fed to a low noise amplifier circuit 120 comprising transistors 121, 122, 123. The low noise amplifier circuit 120, in the illustrated embodiment, provides a gain of about 65 to the incoming electrical signal from the resonant circuit 110.

The electrical signal, after amplification in the amplifier circuit 120, is fed to a filter network 130 comprising first and second differential amplifiers 131, 132. The first and second differential amplifiers 131, 132 serve as filter elements, cooperating to form a bandpass filter to reject frequencies outside of a relatively narrow band (±260 Hz) of allowed frequencies surrounding the subcarrier frequency. This filtering provides some immunity from spurious signals generated by direct sunlight on the solar cell 111.

Next, the amplified, filtered electrical signal is fed to a voltage-controlled oscillator ("VCO") circuit 140. The VCO circuit 140 provides phase-locked loop ("PLL") tuning, allowing the receiver circuit 100 to lock onto valid signal transmissions and reject spurious transmissions not filtered by the filter network 130. The VCO circuit 140 is built around a VCO device 141. Pin 3 of the VCO device 141 receives the amplified, filtered signal. When the VCO device 141 locks onto a valid signal, pin 8 of the VCO device 141 goes low, lighting an indicator LED 142 and enabling an output of the receiver circuit 100 in a manner to be described.

The output of the VCO device 141 is provided on pin 2. A capacitor 143 coupled to pin 2 allows the response rate of the VCO device 141 to signal frequency changes to be set. The output of the VCO device 141 is fed to a transistor 144 that decouples the VCO device 141 from the filter network 130 and the amplifier circuits that follow. The output of the filter network 130 is a substantially square-wave signal that is fed to a second amplifier circuit 150 comprising first and second differential amplifiers 151, 152. The second amplifier circuit 150 is a class A amplifier and further amplifies and shapes the substantially square-wave signal into a command signal containing a digital representation of a command. The command is fed to control mechanism circuitry to be detailed in FIG. 2 to effect remote control of the control mechanism circuitry.

Pin 8 of the VCO device 141 is further coupled to a signal clamping transistor 145. When pin 8 goes low, the signal clamping transistor 145 releases the output of the second differential amplifier 152, allowing the second amplifier circuit 150 to provide the command signal to a receiver circuit output 160.

Table I, below, is a part list for the receiver circuit 100 of FIG. 1. Part numbers are not given for purely generic parts. Those of ordinary skill in the art will recognize that equivalent parts from other manufacturers are substitutable for the parts listed.

TABLE I

| Part | Description | | Manufacturer | Part No. |
| --- | --- | --- | --- | --- |
| U3 | Dual Diff. | Amp | National, Inc | LM358N |
| U2 | VCO | | National, Inc | LMC568CN |
| U1 | Dual Diff. | Amp | Motorola | MC33172P |
| C6 | 10 pF 100 V | Cap | | |
| C8 | 100 pF 100 V | Cap | | |
| C9 C10 C11 C12 | 360 pF 100 V | Cap | | |
| C1 C5 | 100 µF 50 V | Cap | | |
| C7 | 100 µF 35 V | Cap | | |

TABLE I-continued

| Part | Description | Manufacturer | Part No. |
|---|---|---|---|
| C19 | 2.2 µF 35 V Cap | | |
| C16 | .47 µF 35 V Cap | | |
| C20 C22 | 47 µF 35 V Cap | | |
| C13 C21 | 1 pF 100 V Cap | | |
| C14 | .01 µF 100 V Cap | | |
| C2 C3 C4 C15 C18 | .1 µF 100 V Cap | | |
| C17 | 27 pF 100 V Cap | | |
| R21 | 10KΩ Pot | | |
| D1 | Solar Cell 1" × 2" | Solar World | "Supercell" 2 cm × 6 cm |
| R23 R33 | 1KΩ ¼W Res | | |
| R3 R4 R5 R9 R19 R20 R26 R31 R34 | 10KΩ ¼W Res | | |
| R2 R28 R35 | 100KΩ ¼W Res | | |
| R32 | 1MΩ ¼W Res | | |
| R22 | 12KΩ ¼W Res | | |
| R6 | 50Ω ¼W Res | | |
| R15 R17 | 1.5KΩ ¼W Res | | |
| R27 | 15KΩ ¼W Res | | |
| R1 | 20KΩ ¼W Res | | |
| R11 | 22Ω ¼W Res | | |
| R10 | 220Ω ¼W Res | | |
| R12 | 2.2KΩ ¼W Res | | |
| R24 | 330KΩ ¼W Res | | |
| R7 | 47Ω ¼W Res | | |
| R36 | 47KΩ ¼W Res | | |
| R14 R18 R25 | 510KΩ ¼W Res | | |
| R8 | 6.8KΩ ¼W Res | | |
| R30 | 750KΩ ¼W Res | | |
| R29 | 91KΩ ¼W Res | | |
| R13 R16 | 8.45KΩ ¼W Res | | |
| Q1 Q3 Q4 Q5 Q6 | NPN Trans | National, Inc. | 2N3904 |
| Q2 | PNP Trans | National, Inc. | 2N3906 |
| D4 | Red LED | P-Tec, Inc. | P46-WC-S |
| D2 D3 | .4A@60 V Diode | | 1N4148 |
| VR1 | 5.6 V Zener Diode | | 1N5232 |
| T1 | Tuned Autotransformer | DK Enterprises | 98-5420-0 |

Figure 2:
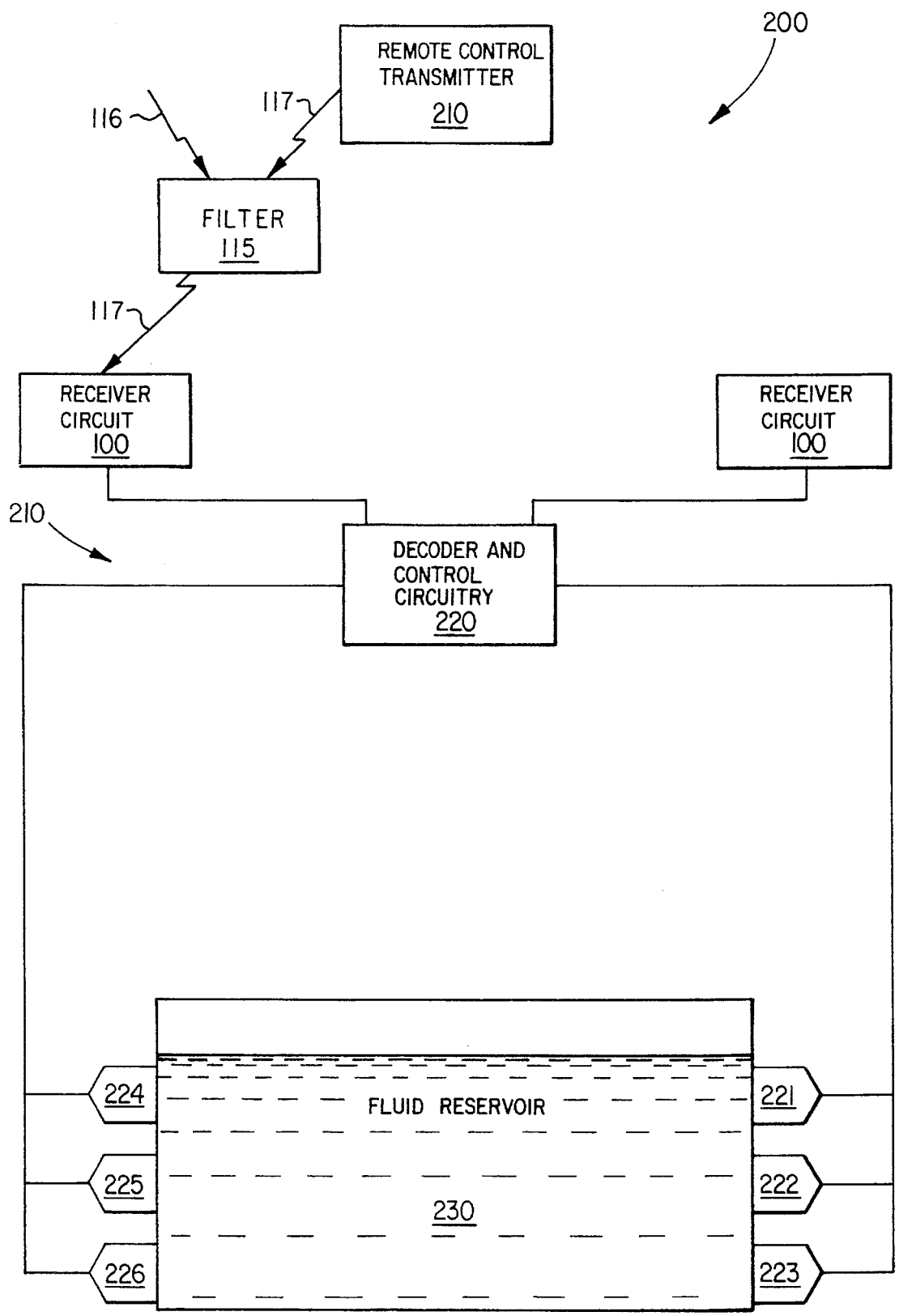
FIG. 2 illustrates a block diagram of a remote controllable fluid control system of the present invention employing the receiver circuit of FIG. 1.

Turning now to FIG. 2, illustrated is a block diagram of a remote controllable fluid control system of the present invention employing the receiver circuit of FIG. 1. The fluid control system, generally designated 200, comprises at least one receiver circuit 100. In the illustrated embodiment, there are two such receiver circuits 100. The receiver circuits 100 are preferably spatially separated from one another such that, when a remote control transmitter 210 generates a directional optical signal 117 only one of the receiver circuits 100 locks onto the signal 117, as shown in FIG. 2.

The receiver circuits 100 are coupled to fluid control circuitry, generally designated 212 and including decoder and control circuitry 220 and various sensors and control mechanisms. The decoder and control circuitry 220 receives the command signal from the receiver circuit 100 that has locked onto a valid optical signal 117 and decodes the command signal in a conventional manner.

One or more sensors are coupled to the decoder and control circuitry 220. The sensors are adapted to sense physical conditions for use by the system 200 and may be selected from the group consisting of: a temperature sensor 221, a pressure sensor 222 and a fluid flow rate sensor 223. The decoder and control circuitry 210 therefore preferably makes system 200 adjustments based on sensed conditions and user commands by controlling the control mechanisms. Such control mechanisms include a temperature regulator 224 (such as a thermostatically-controlled heater), a pump 225 and a valve 226 under control of the decoder and control circuitry 220. The control mechanisms qualitatively or quantitatively control delivery of fluid to a fluid reservoir 230 (the spa or pool itself).

Those of skill in the art will readily recognize other suitable environments for application of the long range, line-of-sight optical remote control receiver of the present invention.

From the above, it is apparent that the present invention provides a receiver circuit and method for receiving a signal having a given carrier frequency. The circuit comprises: (1) a solar cell receiver having a selected capacitance and (2) an inductive device having a selected inductance and coupled to the solar cell receiver, the solar cell receiver and the inductive device cooperating to form a resonant circuit having a selected resonant frequency associated therewith and being a function of the selected capacitance and the selected inductance, the resonant circuit resonating in response to a change in the signal to thereby allow the solar cell to receive data carried by the signal.

Although the present invention and its advantages have been described in detail, those skilled in the art should understand that they can make various changes, substitutions and alterations herein without departing from the spirit and scope of the invention in its broadest form.

What is claimed is:

1. A receiver system for receiving an optical signal, said signal originating at a location, the system comprising:

a solar cell having a selected capacitance;

a filter disposed between the location and said solar cell, said filter passing said signal while attenuating ambient light, said ambient light including sunlight; and an inductive device having a selected inductance and coupled to said solar cell, said solar cell and said inductive device cooperating to form a resonant circuit having a selected resonant frequency associated therewith and being a function of said selected capacitance and said selected inductance, said resonant circuit resonating in response to a change in said signal, whereby said filter attenuating said ambient light and passing said signal permits said resonant circuit to resonate at said resonant frequency in response to said signal.

2. The receiver circuit as recited in claim 1 wherein said given carrier frequency is substantially infrared.

3. The receiver circuit as recited in claim 1 wherein said inductance is tunable.

4. The receiver circuit as recited in claim 1 wherein said signal is pulse modulated to enable said signal to carry said data.

5. The receiver circuit as recited in claim 1 wherein said resonant circuit is coupled to an amplifier circuit to amplify said signal as received by said resonant circuit.

6. The receiver circuit as recited in claim 1 wherein said inductive device is a tunable step-up autotransformer.

7. The receiver circuit as recited in claim 1 wherein said solar cell receiver and said inductive device are connected in electrical parallel.

8. The receiver circuit as recited in claim 1 further comprising a capacitor coupled to said solar cell receiver to alter said selected resonant frequency of said resonant circuit.

9. The receiver circuit as recited in claim 1 wherein said receiver circuit is part of a remote controllable device, a control mechanism coupled to said receiver circuit and adapted to receive and respond to a command signal from said receiver circuit.

10. The receiver circuit as recited in claim 1 wherein said receiver circuit is part of a remote controllable fluid control apparatus.

11. A method for receiving a signal having a given carrier frequency, comprising the steps of:
   providing a solar cell receiver having a selected capacitance and an inductive device having a selected inductance and coupled to said solar cell receiver, said solar cell receiver and said inductive device cooperating to form a resonant circuit having a selected resonant frequency associated therewith and being a function of said selected capacitance and said selected inductance;
   providing a filter capable of passing said carrier frequency and attenuating ambient light, said ambient light including sunlight;
   disposing said filter in an overlying relationship to said solar cell receiver, such that said filter is intermediate said ambient light and said solar cell receiver; and
   receiving said signal at said given carrier frequency into said resonant circuit, said resonant circuit resonating in response to a change in said signal to thereby allow said solar cell receiver to receive data carried by said signal.

12. The method as recited in claim 11 wherein said step of receiving comprises the step of receiving a signal having a substantially infrared carrier frequency.

13. The method as recited in claim 11 further comprising the step of tuning said inductance.

14. The method as recited in claim 11 further comprising the step of pulse modulating said signal to enable said signal to carry said data.

15. The method as recited in claim 11 further comprising the step of coupling said resonant circuit to an amplifier circuit to amplify said signal as received by said resonant circuit.

16. The method as recited in claim 11 wherein said step of providing comprises the step of providing a tunable step-up autotransformer.

17. The method as recited in claim 11 wherein said step of providing comprises the step of connecting said solar cell receiver and said inductive device in electrical parallel.

18. The method as recited in claim 11 wherein said step of providing further comprises the step of coupling a capacitor to said solar cell receiver to alter said selected resonant frequency of said resonant circuit.

19. The method as recited in claim 11 wherein said receiver circuit is part of a remote controllable device, said method further comprising the step of receiving a command signal from said receiver circuit into a control mechanism, said control mechanism adapted to respond to said command signal.

20. The method as recited in claim 11 wherein said receiver circuit is part of a remote controllable fluid control apparatus.

21. A remote controllable fluid control system, comprising:
   a remote control transmitter circuit for transmitting a signal having a given carrier frequency and data carried thereby;
   a receiver circuit for receiving said signal from said remote control transmitter circuit and including:
     a solar cell receiver having a selected capacitance, and
     an inductive device having a selected inductance and coupled to said solar cell receiver in electrical parallel, said solar cell receiver and said inductive device cooperating to form a parallel resonant circuit having a selected resonant frequency associated therewith and being a function of said selected capacitance and said selected inductance, said parallel resonant circuit resonating in response to a change in said signal to thereby allow said solar cell receiver to receive said data carried by said signal;
   an optical filter interposed between said transmitter circuit and said receiver circuit for attenuating ambient light, said ambient light including sunlight, such that said signal is received by said receiver circuit, but substantially all of said ambient light is attenuated;
   a decoder circuit coupled to said receiver circuit for decoding said signal as received by said receiver circuit and producing, in response thereto, a command signal representing a control command for said fluid control system; and
   fluid control circuitry coupled to said amplifier circuit and adapted to receive and respond to said command signal by controlling a fluid control mechanism.

22. The fluid control system as recited in claim 21 wherein said given carrier frequency is substantially infrared.

23. The fluid control system as recited in claim 21 wherein said signal is pulse modulated to enable said signal to carry said data.

24. The fluid control system as recited in claim 21 wherein said inductive device is a tunable step-up autotransformer.

25. The fluid control system as recited in claim 21 further comprising a capacitor coupled to said solar cell receiver to alter said selected resonant frequency of said parallel resonant circuit.

26. The fluid control system as recited in claim 21 wherein said fluid control mechanism is selected from the group consisting of:
   a temperature regulator,
   a pump and
   a valve.

27. The fluid control system as recited in claim 21 further comprising a fluid reservoir, said fluid control mechanism controlling delivery of fluid to said reservoir.

28. The fluid control system as recited in claim 21 further comprising a sensor coupled to said fluid control circuitry, adapted to sense physical conditions for use by said fluid control circuitry to control said fluid control mechanism, said sensor being selected from the group consisting of:
   a temperature sensor,
   a pressure sensor and
   a fluid flow rate sensor.

* * * * *